United States Patent [19]

Betancourt

[11] Patent Number: 5,447,184

[45] Date of Patent: Sep. 5, 1995

[54] PORTABLE TRANSMISSION FLUID EXCHANGING SYSTEM

[76] Inventor: Eduardo Betancourt, 1128 Stanley Ave., Apt. 303, Long Beach, Calif. 90804

[21] Appl. No.: 262,435

[22] Filed: Jun. 20, 1994

[51] Int. Cl.$^6$ ............................. B65B 1/04; B65B 3/04; B67C 3/02

[52] U.S. Cl. ............................................ 141/98; 141/4; 141/65; 184/1.5; 184/106; 134/169 C

[58] Field of Search ........................... 141/1, 4, 5, 65, 67, 141/83, 94, 95, 98; 134/166 C, 169 C; 165/95; 184/1.5, 106; 137/625.29, 599.1, 595, 637, 625.18

[56] References Cited

U.S. PATENT DOCUMENTS

| | | | |
|---|---|---|---|
| 2,707,453 | 5/1955 | Boyle | 116/276 |
| 3,513,941 | 5/1970 | Becnel | 184/1.5 |
| 4,095,673 | 6/1978 | Takeuchi | 184/106 |
| 4,193,487 | 3/1980 | Takeuchi | 184/1.5 |
| 5,148,785 | 9/1992 | Sendak | 184/1.5 |
| 5,291,968 | 3/1994 | Brown | 184/106 |
| 5,318,080 | 6/1994 | Viken | 141/65 |

*Primary Examiner*—Henry J. Recla
*Assistant Examiner*—Timothy L. Maust
*Attorney, Agent, or Firm*—Ralph S. Branscomb

[57] ABSTRACT

A portable fluid exchanger for flushing the used transmission fluid from a vehicle engine as it replaces it with new fluid is mounted on a wheeled undercarriage and contains a tank of new transmission fluid, hoses, and a 12-volt electrical system which connects to the battery of the vehicle being serviced to power a fluid delivery pump, an output and return flow control system, and means for visually checking the condition of the fluid being pumped from the transmission. The normal continuous-flow circulation system of the vehicle is interrupted by interposing the exchanger in a cooling line of the transmission system, and the vehicle's own pump is used to expel fluid from the transmission while the exchanger introduces new fluid, as the vehicle engine idles. The fluid level in the transmission is gauged by monitoring inflow and outflow to and from the transmission to insure that it remains reasonably full during the flushing process. Indicators and controls are provided both to ascertain the flow direction of the transmission fluid cooling pump, and to effectively reverse the coupling between the transmission and the exchanger without disconnecting the attachment lines, to synchronize flow direction of the exchanger pump with that of the vehicle pump.

4 Claims, 2 Drawing Sheets

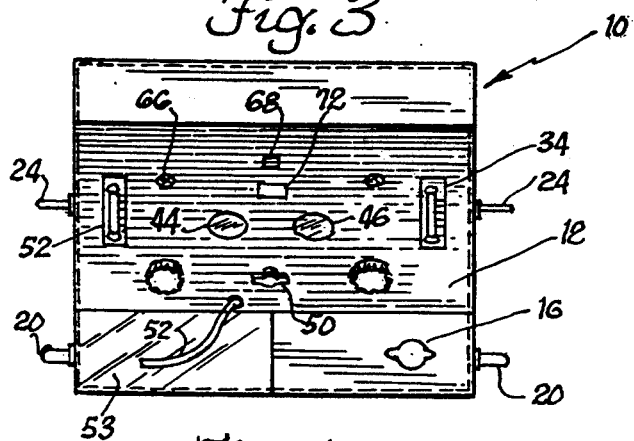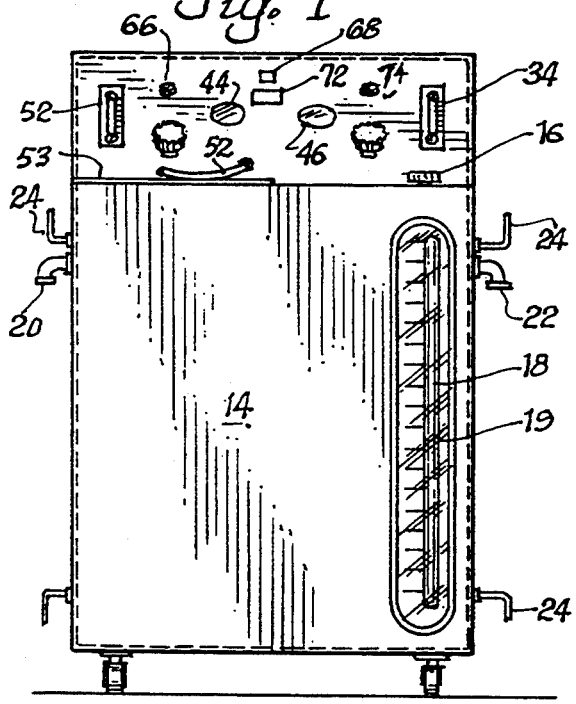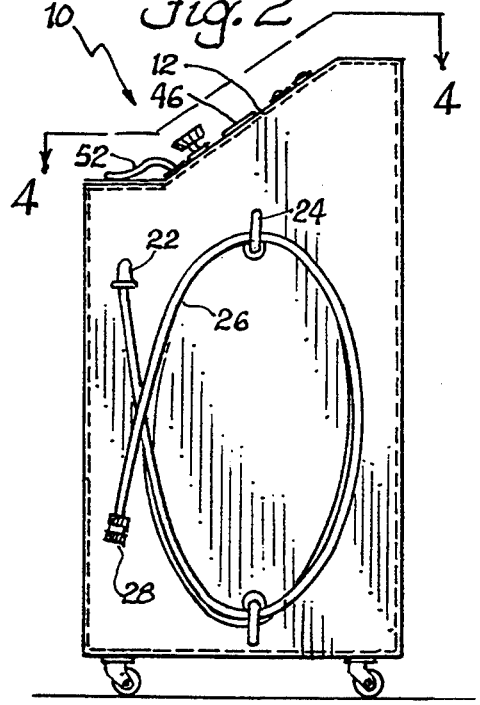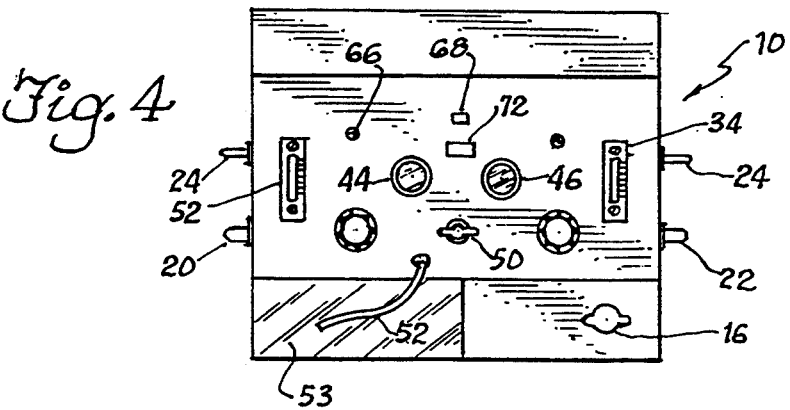

PORTABLE TRANSMISSION FLUID EXCHANGING SYSTEM

BACKGROUND OF THE INVENTION

The invention is in the field of vehicular maintenance and is a companion to U.S. Pat. No. 5,289,837 issued Mar. 1, 1994 on a ENGINE CLEANING SYSTEM. That unit was a self-contained system that purged the fuel passageways of an internal combustion engine. The instant invention addresses the transmission rather than the engine, replacing the fluid rather than scrubbing the passageways.

Transmission fluid ("oil") should be replaced periodically over the full life of an automatic transmission if its lifespan is to be maximized. Traditionally this has been done by removing the transmission oil pan with the old oil in it, dumping it and refilling the system with new oil. Unlike the crankcase, the transmission does not have a convenient drain opening at the bottom of the pan. Alternatively, some commercial systems draw the fluid out through the fill spout.

Unfortunately both of these techniques suffer from the same drawback. Whereas they both replace the oil in the pan, this represents only 25% to 35% of the total fluid in the system, the rest of which at any given time will reside in the transmission's torque converter, valve box, clutch chamber, fluid cooling system and in other inaccessible passageways.

Ideally these passageways and compartments should be flushed and the resident oil replaced as well as the fluid in the pan. In addition to removing any debris from wearing parts, the high temperatures at which transmissions operate cause the breakdown of the fluid and its lubricating capacity, so new fluid is needed whether or not actual debris is found in the fluid or on transmission surfaces, and the entire volume of oil in the transmission housing should be replaced. Because of the relative complexity of the job compared to oil changes, and the fact that only a fraction of the fluid is replaced anyway unless the fluid replacement is performed multiple times separated by periods of engine operation, fluid is not replaced as often as it should be and transmission deterioration progresses accordingly.

There is a need for a simple machine which has the capability of flushing the entire transmission and replacing the fluid at the same time, and in one operation, obviating repetitious steps while leaving no pools of untouched fluid in the recesses of the transmission.

SUMMARY OF THE INVENTION

The instant invention fills the need for a flushing system that thoroughly flushes out the transmission in a single sitting, purging it while running, and flushing through a volume of oil equal to three- to five- times the fluid capacity of the transmission to ensure complete replacement of all fluid in all parts and passageways. 100% of the fluid, and all the dissolved broken-up anti-rust and corrosion-resistive additives which cause wear and premature failure, are expelled from the engine, leaving no pockets of grime and chemical debris.

An important feature of the system enables the operator to ascertain the normal flow direction of the fluid in the transmission cooling system under action of the vehicle's pump. Once the normal flow direction is known, if the lines of the purging system turn out to be reversed, they can be switched with a valve without having to remove and switch the hose connections between the transmission and the exchanger (there is generally no way of making this flow direction determination other than by trial and error). Means are also provided to monitor and control flow rates into and out of the transmission so that the fluid level remains stable, and on demand a small sampler tube will discharge a quantity of fluid as it is purged from the transmission to determine its state of cleanliness of the fluid so that the operator will know when the flushing is complete.

BRIEF DESCRIPTION OF THE DRAWINGS

FIG. 1 is a front elevation view of the flushing unit;

FIG. 2 is a side elevation view from the right side of the unit as seen in FIG. 1;

FIG. 3 is a top plan view of the system;

FIG. 4 is a layout view taken along the line 4-4 FIG. 2;

DETAILED DESCRIPTION OF THE PREFERRED EMBODIMENT

Figure 5:
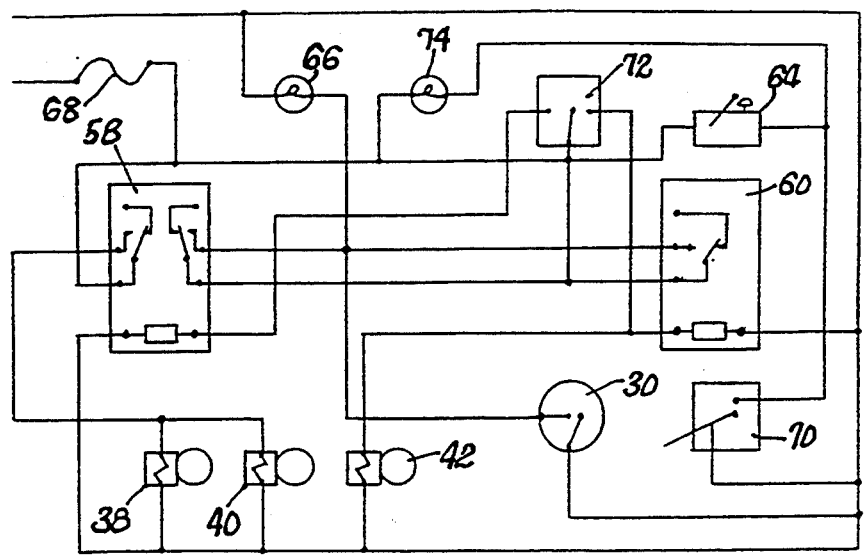
FIG. 5 is a schematic diagram of the circuitry which enables the system to operate.

The system is contained in a console housing 10 and is controlled by means of various switches and knobs on the control panel 12 which defines a sloped platform at the top of the housing. The housing contains a transmission fluid tank 14 which is large enough to hold a complete supply of fluid needed to service a car or small truck. To keep the bulk of the unit to a minimum, the used fluid from the transmission is pumped into a recycling facility directly rather than being stored temporarily in the exchanger.

A fuel spout 16 opens near the top housing for replenishing the new fluid supply, and a vertical visual fluid level gauge 18 is mounted inside the housing and is visible through an elongated aperture 19 defined in the housing. Two hose bibs 20 and 22 connect to hoses 26 which lead to the transmission, with 20 being on the return line side and 22 the supply line side. Hose hooks 24 conveniently store the hoses 26 when not in use. Each hose has a snap-on connector 28 which fits an adaptor which connects to the transmission hose line leading to or from the radiator. To install, an existing, accessible transmission cooling hose connecting the transmission and its radiator is disconnected, and the flushing system is interposed in the line by connecting the two hoses attached to the bibs 20 and 22, one to the disconnected vehicle hose and one to the fitting on the radiator or transmission from which the hose was disconnected. Now, when the transmission pump operates as the engine idles, the old oil is pumped out through one hose and the new transmission fluid pumped in through the other.

Figure 6:
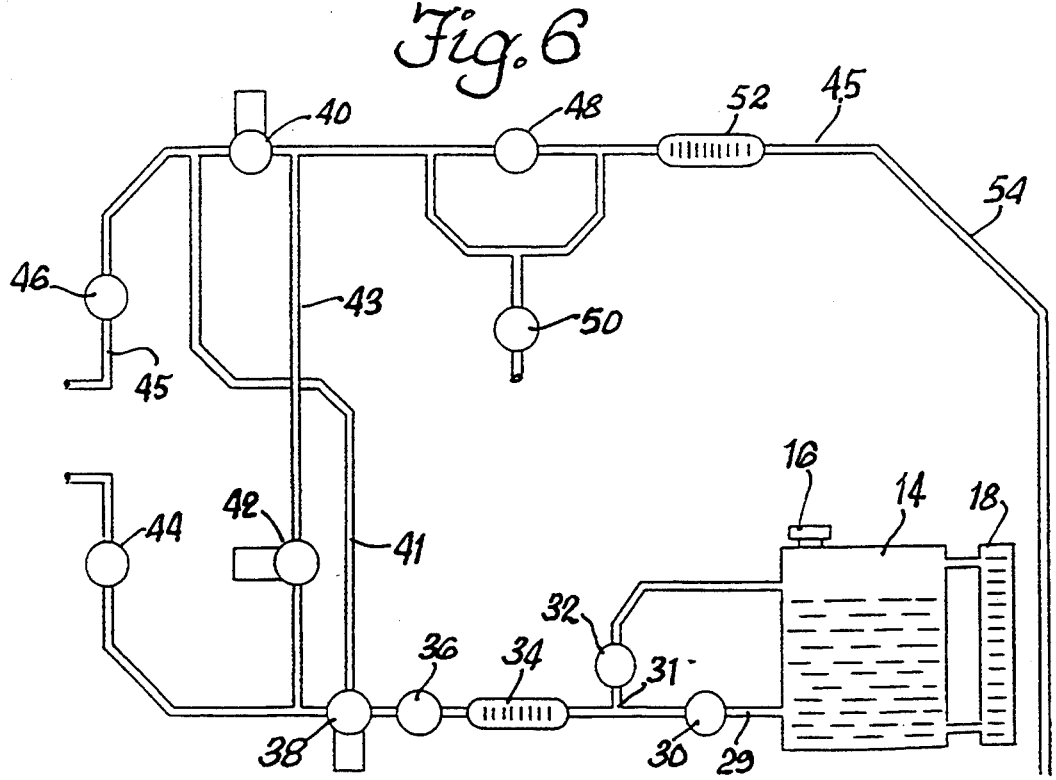
FIG. 6 is a diagrammatic flow chart illustrating the mechanism of the fluid flow.

As best seen in FIG. 6, the reservoir has a supply line 29 connected to it through which it delivers fluid to the transmission. A pump 30 in the line pumps through a T-junction 31 which connects to a return loop having a valve 32 which can be adjusted to divert any selected fraction of the fluid that is being pumped back into the reservoir 14 so that wide range of net flow rates into the transmission can be effected.

The supply line 29 continues out through a flow meter 34 which is visible in the instrument panel of the console as shown in FIGS. 1 and 3. The next utility in the line is the check valve 36 which prevents the back flow of dirty transmission fluid into the clean fluid reservoir, subsequent to which the supply line splits at the 3-way solenoid valve 38 which operates in phase and concurrently with valve 40 and out of phase with valve 42 to reverse the coupling direction between the purging system and the transmission. Normally, the valve 38 would be de-energized, in which state it is open along the horizontal direction in the diagram and closing off the reverse bypass line 41 entering it from the top in the diagram. Supply fluid from the reservoir flows out through the flow indicator 44 and then to the transmission.

However, this only works when the fluid pump of the transmission is pumping fluid out one side of the transmission while the exchanger pumps it into the other side, so the two pumps are not working at cross purposes. If this is not the case and the hoses have been connected "backwards", these solenoid-controlled valves 38, 40 and 42 are actuated to reverse the connection so that fluid is supplied to line 41 as shown in FIG. 6 rather than straight through, and the return fluid crosses back to the return line through the bypass line 43.

The fluid returning from the transmission cannot be pulled by the pump 30 inasmuch as the transmission is not a completely closed system, so it works well to pump the fluid into the transmission with the pump 30 and pump the old fluid out to the recycling container with the vehicle pump, which is ordinarily used to pump the transmission fluid through a fluid-cooling radiator. The flushing process takes place with the engine running at idle so that there is circulation of the fluid in the transmission case, and the vehicle pump is working in concert with pump 30, expelling the old while introducing the new. The expelled fluid is a mixture of clean and dirty fluid which returns back through the purging apparatus, for flow control and inspection of outcoming fluid quality on the way to an external recycling container, not shown.

With further reference to FIG. 6, as the fluid exits the transmission, it passes into the return line 45 and through a flow indicator 46. From there, through the valve 40, it splits into a "D" configuration with the top flow rate control valve 48 interposed in it, and the bottom communicating with a valve 50 which drains through a hose 52. This drain is for the purpose of spreading a sample of transmission fluid on the glass of the tray 53 which lies along the lower portion of the control panel 12. This permits the operator to periodically sample and inspect the transmission fluid with the aim of ascertaining when it is appropriate to wind up the flushing operation as the fluid gets cleaner and cleaner. Because new fluid is used to purge out the old fluid, the old fluid will still remain in noticeable amounts in the drain fluid until the transmission's fluid volume has been replaced several times.

When purging an engine of unknown characteristics, the operator first disconnects a hose leading between the transmission and the transmission radiator and couples the open line ends, through adapters, to the hoses 26. Then, without starting up the pump of the flushing system, the automobile engine is started and revved until some flow of the transmission fluid powered by the internal pump occurs. This is monitored visually by the operator through the flow indicators 44 and 46. Because the transmission pump only expels fluid and does not draw it in, as the engine idles, there will be fluid flow through the flow indicators 46 and 44, unless the hoses are reversed and the opposite is true. Flow direction is generally only determinable by trial and error. The operator, by observing these two flow indicators, determines which indicator is registering and throws the single-pole double-throw power switch 72 to the side of the control panel mounting the flow indicator which indicates flow.

This switch in turn activates, respectively and alternatively, relays 58 and 60, which operate the valves 38 & 40, and 42. The valves work together in the following fashion. Valves 38 and 40 normally permit free flow from left to fight or vice versa with the valve 38 cutting off the line 41. In this configuration fluid flows straight along the bottom line of FIG. 6 and into the transmission and then back through the return line 45, the flow meter 53 and through the recycling tube 54 into the recycle drum.

These two valves in turn are coupled with the valve 42 but out of phase, so that when the first set closes to divert the flow to line 41, valve 42 opens to permit the return fluid to rise up and pass through bypass 43, the return line 45 and out through the recycling hose 54. Thus the flow of transmission fluid in the transmission is implemented in the proper direction.

Now that the fluid is flowing in the proper direction, the operator establishes reasonable parity between the fluid entering and leaving the transmission. Because the transmission is not sealed it will not automatically retain only a set amount of fluid but varies depending on inflow versus outflow. Monitoring the level is done by visual observation of gauges 34 and 51 to ensure that the volumes of fluid entering and leaving the transmission are about equal, after initially, and thereafter periodically, checking the actual level with the transmission's own dipstick. After the fluid level is properly established, it is maintained by the adjustment of the supply control knob 50 which controls the valve 32, while the operator monitors the flow rate indicators 34 and 51.

ELECTRICAL OPERATION

Referring to FIG. 5, + and − DC power is provided courtesy of the vehicle being serviced, the battery of which is tapped by jumper-type clamps and cables, inputting power from the upper left of the drawing and through the circuit breaker 68. The main power switch 72 can rest in the central, neutral (off) position or it can be thrown to the left or right. To the fight, it actuates the "in service" light 66 and directly powers the pump 30 and the relay 60. On closing, the relay in turn powers the solenoid-controlled normal-direction valve 42, causing it to close. When the toggle is thrown to the left from the fight, first relay 60 and thus valve 42 are deenergized and then relay 58 is closed, actuating reverse-flow valves 38 & 40, while simultaneously directly powering the indicator 66 and the pump 30.

The tank 14 is provided with a level sensor 70 that actuates both a buzzer 64 and a light 74. The threshold of the sensor is about 3 quarts. Double alarms (audio and visual) hopefully ensure that the operator is made aware of the low fluid condition, as it is essential to the wellbeing of the transmission that it not be allowed to completely drain and operate dry.

For flushing transmissions, the system is advantageous because of its portability, flow direction indicating and reversing capabilities, and other operator-friendly features. Useable in the field (with a container for waste fluid) as well as in the service bay, the unit is being compact and self-sufficient, it will accommodate the transmission of any ordinary vehicle.

It is intended that the exact nature of the disclosed embodiment not be limiting as a number of other ways of piping and configuring system are equally serviceable in the alternative.

I claim:

1. For a vehicle transmission having a fluid-containing casing, and a fluid circulatory system which includes a vehicle-mounted fluid pump for circulating fluid and a circulation loop extending outside said transmission and being separable into mating portions defining open ports, a transmission fluid exchanger comprising:
   (a) a console having an integral frame;
   (b) a fluid circulation passageway having an outgoing side defined by:
      (i) a new-transmission-fluid tank mounted on said frame;
      (ii) an outgoing fluid hose communicating with said tank; and
      (iii) a pump, said pump, tank and hose being operatively interconnected to pump fluid from said tank out through said hose, and,
   (c) an incoming side defined by a return hose entrant into said console, such that if said hoses were both connected in communication with said casing, a continuous fluid passageway would be defined from said tank out through said outgoing fluid hose, through said casing and back through said incoming fluid hose to said console;
   (d) adapters for connecting said hoses to said fluid circulatory system; and,
   (e) indicator means operative with said fluid circulation passageway to indicate to an operator which direction the fluid is flowing in said passageway, and direction-reversing plumbing and valving on board said console to reverse the direction of flow effected by said pump without reversing the pump direction such that an operator can attach said hoses to said transmission circulatory system, determine which way fluid is flowing in said system, realign the exchanger with the flow direction if necessary by operating said valving to reverse the direction of fluid flow in said passageway without having to disconnect fluid lines, and force fluid into said casing while pumping fluid out of the casing with said vehicle-mounted pump.

2. Structure according to claim 1 wherein said plumbing to reverse the directional relationship comprises complementing bypass lines actuated by solenoid-driven valves controlled by a single switch on said console.

3. Structure according to claim 2 wherein said outgoing side and said incoming side of said passageway each includes a flowmeter to permit an operator to maintain approximate flow parity between same, said console mounts said flowmeters and said incoming side exits said console through a waste fluid hose to a remote recycling receptacle.

4. A method of exchanging the fluid in a vehicle transmission having a fluid circulatory system having a loop extending outside from the transmission casing comprising the following steps:
   (a) disconnecting said loop at one end from the transmission to expose two open ports;
   (b) interposing a fluid exchanger having
      a first pump and reservoir of fluid, and
      (ii) a pair of hoses, and
      (iii) a second pump for pumping fluid out of said transmission,
   all in series by connecting said hoses to said open ports;
   (c) energizing said pump to pump fluid into said transmission through one of said hoses to displace the fluid already in said transmission and including means to monitor the existence of fluid flow in each of said hoses and further including means to reverse the synchronization between the flow in said exchanger driven by said first pump and the flow in said transmission driven by said second pump, said means to reverse comprising solenoid-valve-controlled bypass pipes and a switch for operating same, and including the steps of monitoring said means to monitor and operating said means to reverse by throwing said switch controlling said bypass valves if the flow directions in said first an second pumps are opposite one another.

* * * * *